US008519838B2

(12) United States Patent
Walsh et al.

(10) Patent No.: US 8,519,838 B2

(45) Date of Patent: Aug. 27, 2013

(54) METHOD AND SYSTEM FOR ON-BOARD VEHICLE DETECTION OF HARMFUL MATERIAL

(75) Inventors: John P. Walsh, Valley Cottage, NY (US); Anne Dowling, Bayside, NY (US)

(73) Assignee: Clever Devices, Ltd, Plainview, NY (US)

( * ) Notice: Subject to any disclaimer, the term of this patent is extended or adjusted under 35 U.S.C. 154(b) by 208 days.

(21) Appl. No.: 13/070,947

(22) Filed: Mar. 24, 2011

(65) Prior Publication Data

US 2012/0242472 A1 Sep. 27, 2012

(51) Int. Cl.
*B60Q 1/00* (2006.01)

(52) U.S. Cl.
USPC .................. 340/438; 340/425.5; 340/539.22; 340/500; 701/1

(58) Field of Classification Search
USPC ................ 340/438, 425.5, 500, 517, 539.22, 340/539.26; 701/1
See application file for complete search history.

(56) References Cited

U.S. PATENT DOCUMENTS

| | | | | |
|---|---|---|---|---|
| 7,302,323 | B2 * | 11/2007 | Anderson et al. | 701/32.7 |
| 7,525,421 | B2 * | 4/2009 | Levesque et al. | 340/517 |
| 7,872,575 | B2 * | 1/2011 | Tabe | 340/540 |
| 7,880,767 | B2 * | 2/2011 | Chinigo | 348/148 |
| 8,026,846 | B2 * | 9/2011 | McFadden et al. | 342/357.55 |
| 8,102,251 | B2 * | 1/2012 | Webb | 340/539.1 |
| 8,115,608 | B2 * | 2/2012 | Davis et al. | 340/425.5 |
| 8,159,341 | B2 * | 4/2012 | Waugh | 340/539.27 |
| 8,205,796 | B2 * | 6/2012 | Macklin et al. | 235/382 |
| 2002/0084900 | A1 * | 7/2002 | Peterson et al. | 340/573.1 |
| 2008/0088434 | A1 * | 4/2008 | Frieder et al. | 340/539.11 |
| 2010/0148946 | A1 * | 6/2010 | Strombeck et al. | 340/425.5 |
| 2012/0146778 | A1 * | 6/2012 | Davis et al. | 340/425.5 |

* cited by examiner

*Primary Examiner* — Eric M Blount

(74) *Attorney, Agent, or Firm* — The Farrell Law Firm, P.C.

(57) ABSTRACT

An on-board terrorist threat detection and reporting system and method are provided for use on-board a transportation vehicle. The system includes a plurality of sensors for sensing a potential threat. The plurality of sensors are positioned on the transportation vehicle. The system also includes a database for storing threat related reference information, and a memory unit for storing sensor information corresponding to the potential threat sensed by one or more of the plurality of sensors. The system further includes a processor for analyzing the sensor information and corresponding threat related reference information.

20 Claims, 2 Drawing Sheets

METHOD AND SYSTEM FOR ON-BOARD VEHICLE DETECTION OF HARMFUL MATERIAL

BACKGROUND OF THE INVENTION

1. Field of the Invention

The present invention relates generally to a method and system for detection of harmful material, and more particularly, to a method and system that detects and reports a material identified as a potential threat on-board a transportation vehicle.

2. Description of the Related Art

Public transit is a part of every-day life in many parts of the world and, in particular, urban environments. Because public transit systems naturally result in an accumulation of a large number of people in a small or confined space, public transit vehicles have become a more popular target for terrorist attacks. The safety of those utilizing public transit can be assisted by precautions that are provided by the public transit system. Typically, public transit systems rely on security patrols, random bag checks, removal of unattended bags, and consumer awareness to thwart terrorist attacks.

One type of terrorist attack involves use of or exposure to nuclear material, which could inflict a maximum amount of harm when carried out in crowded commuter environments. The effects of nuclear radiation from a physiological point of view are directly related to the duration and intensity of exposure. A breach in security at a nuclear medical facility or other location could allow the undetected theft of this material for a significant amount of time. If multiple people carry and deploy small quantities of nuclear materials, the cumulative potential of high levels of exposure to persons using the transit vehicle or system increases significantly. If this activity were to occur at multiple locations, the amount of nuclear material, although small in volume, would have a potentially deadly effect on individuals exposed to the nuclear emissions for a significant amount of time.

Recently, devices have been developed that are able to detect radiation and track possible radiation sources. When detected radiation levels exceed a threshold, the developed devices may notify proper authorities. Vehicles have also been developed that are able to detect weapons, and wirelessly communicate warnings when a weapon is detected. Further, general methods have been provided for identifying potential nuclear threats in cargo.

SUMMARY OF THE INVENTION

The present invention has been made to address at least the above problems and/or disadvantages and to provide at least the advantages described below. Accordingly, an aspect of the present invention provides for threat detection and reporting in a transit system.

According to one aspect of the present invention, a threat detection and reporting system is provided on-board a transportation vehicle. The system includes a plurality of sensors for sensing a potential threat. The plurality of sensors are positioned on the transportation vehicle. The system also includes a database for storing threat related reference information, and a memory unit for storing sensor information corresponding to the potential threat sensed by one or more of the plurality of sensors. The system further includes a processor for analyzing the sensor information and corresponding threat related reference information.

According to another aspect of the present invention, an on-board threat detection and reporting method is provided. A potential threat is monitored for a plurality of sensors positioned on the transportation vehicle. Threat related reference information is stored in a database of the transportation vehicle. Sensor information is stored corresponding to the potential threat, when the potential threat is sensed by one or more of the plurality of sensors. The sensor information and corresponding threat related reference information are analyzed at a processor in the transportation vehicle.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Embodiments of the present invention are described in detail with reference to the accompanying drawings. Detailed descriptions of constructions or processes known in the art may be omitted to avoid obscuring the subject matter of the present invention.

Figure 1:
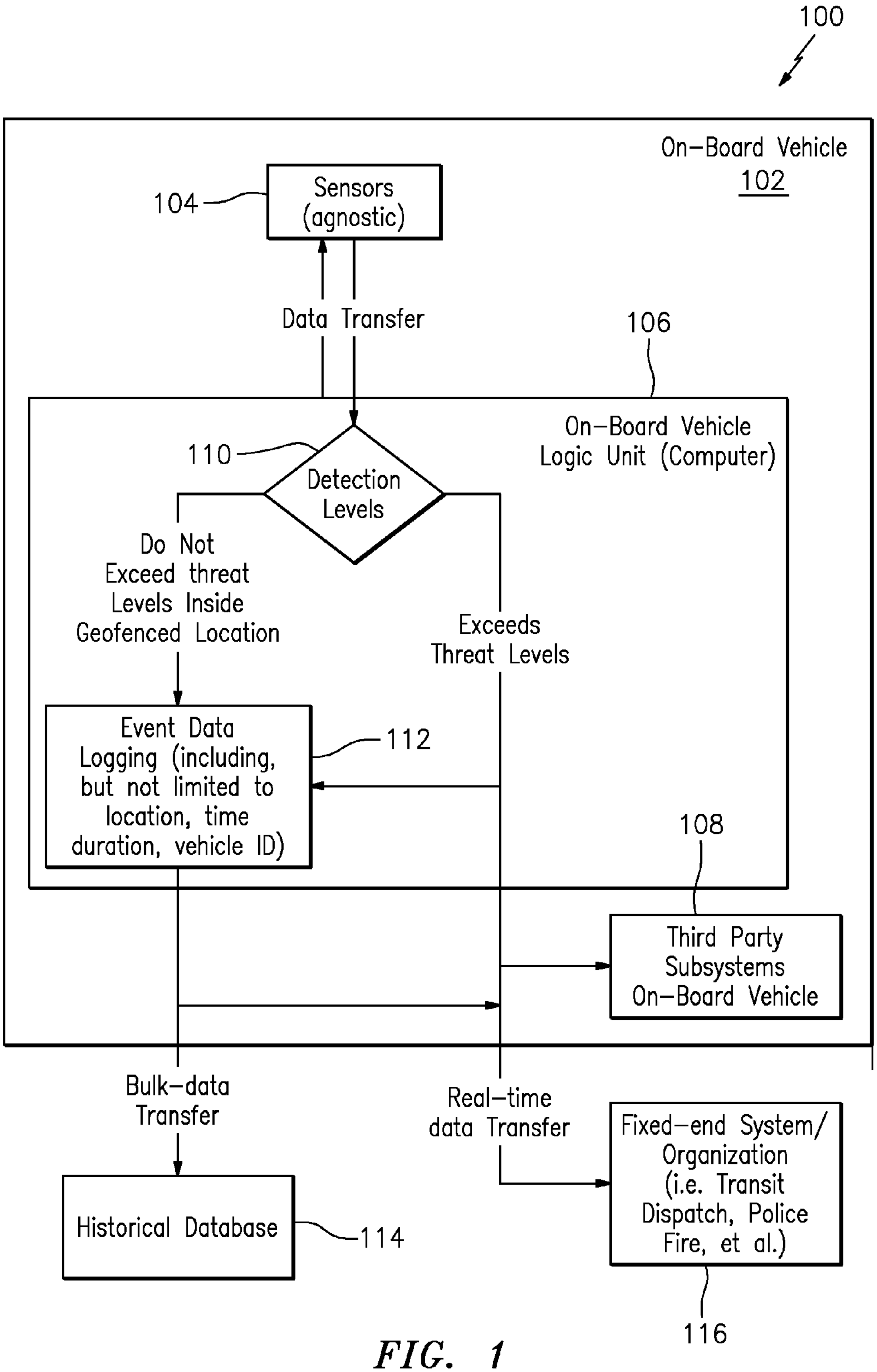
FIG. 1 is a diagram illustrating a threat detection and reporting system, according to an embodiment of the present invention.

Referring initially to FIG. 1, a diagram illustrates a terrorist threat detection and reporting system 100, according to an embodiment of the present invention. The system 100 includes a vehicle 102 of a transit system. The vehicle 102 includes sensors 104, an on-board logic unit (computer) 106 and on-board third party subsystems 108.

The sensors 104 are capable of detecting emissions when materials considered potential threats enter the vehicle 102, and also detect the continued presence of these emissions on the vehicle. Specifically, the sensors 104 may be positioned adjacent to all vehicle entrances to detect entry and exit of the material. The sensors 104 may also be positioned throughout the interior of the vehicle to detect emissions resulting from the continued presence of the material on the vehicle. The number of sensors used and their locations may be determined in accordance with the layout and configuration of the vehicle interior, and in accordance with the sensitivity of the sensors 104.

Data from the sensors 104 is transferred to the on-board logic unit 106. The on-board logic unit 106 includes a detection level determining unit 110 and an event data logging unit 112. Specifically, data from the sensors 104 is provided to the detection level determination unit 110. The detection level determination unit 110 determines whether the levels detected from the sensors 104 exceeds threat threshold levels for a given location or area using sensor information and threat related reference information.

The sensor information may include a time and date when sensing of emissions from a potential threat begins, a time and date when sensing of emissions from the potential threat ends, identifiers of sensors that sense the emissions from the potential threat, a position of the sensors that sense the emissions from the potential threat within the transportation vehicle, a material identified as the potential threat, an emission level of the material, a location of the material within the transportation vehicle, and a location of the transportation vehicle. The location of the transportation vehicle can be determined by a locating unit, which utilizes odometer readings and a Global Positioning System of the transportation vehicle.

The threat related reference information may include materials that are known as potential threats, material emission levels known to be harmful, geographic areas that are known to contain the materials that are known as potential threats, geographic areas that are known to cause false-positives in identifying potential threats, geographic areas where the transportation vehicle is known to be out of service, and material emission levels appropriate for each geographic area.

The resulting determination provided from the sensor information and the threat related reference information at the detection level determination unit 110 is provided to the event data logging unit 112, where the determination and at least one of a location, time, duration and vehicle identification are logged. Resulting data from the event data logging unit 112 of the on-board vehicle logic unit 106 is bulk-data transferred to an external historical database 114.

When the combination of sensor information and threat related reference information indicates that detection levels exceed authorized threat levels for a given location, there is a real-time data transfer from the detection level determination unit 110 of the on-board logic unit 106 to the third party subsystems 108 and one or more external fixed-end systems or organizations 116. The third party subsystems 108 that are on-board the vehicle can notify a vehicle's operator and passengers of the potential threat that is on board, while the fixed end system or organization may include law enforcement or other proper authorities.

Figure 2:
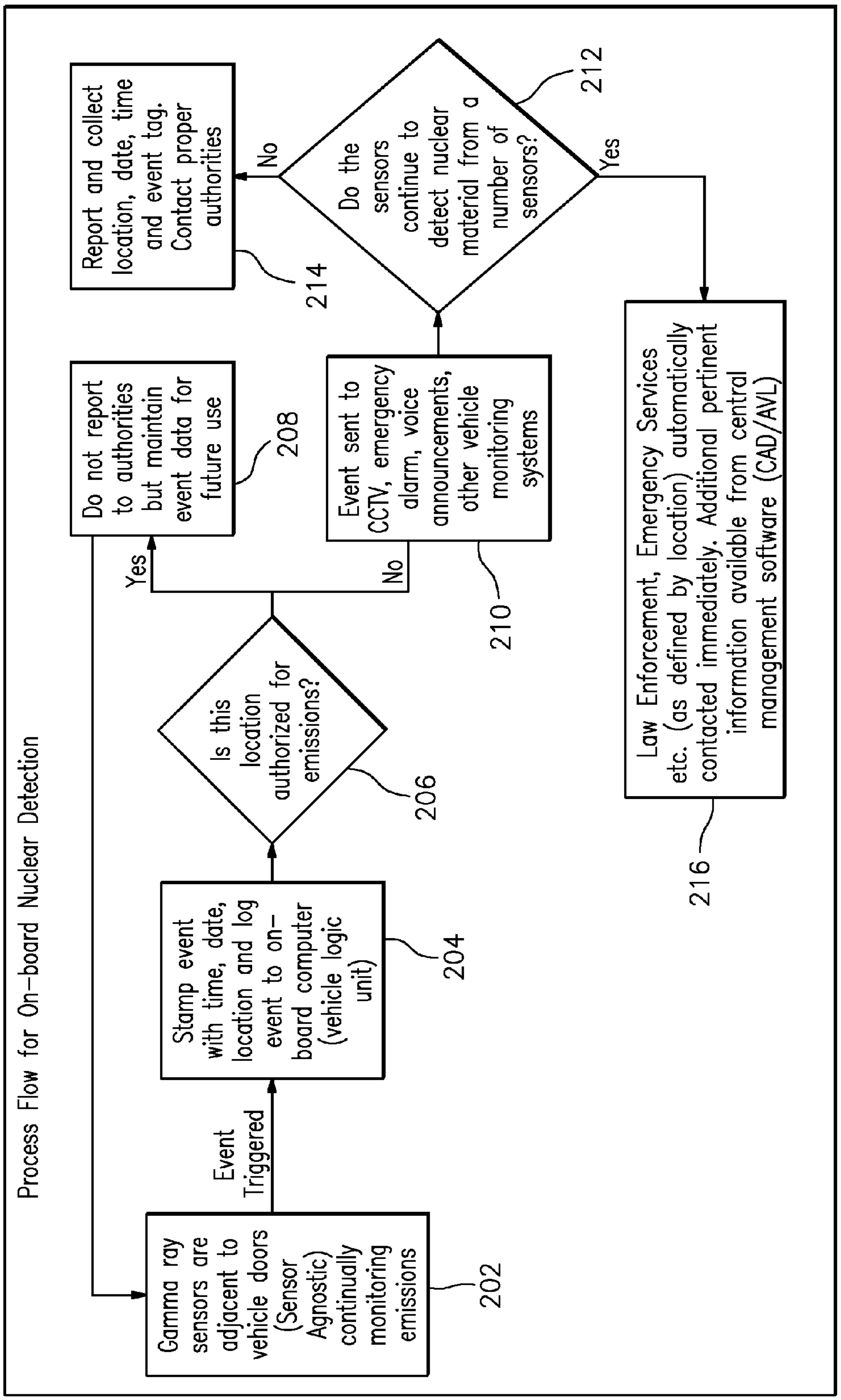
FIG. 2 is a flowchart illustrating a threat detection and reporting methodology, according to an embodiment of the present invention.

Referring now to FIG. 2, a flowchart illustrates a threat detection and reporting methodology, according to an embodiment of the present invention. The methodology begins in block 202 in which the sensors 104 continuously monitor for emissions from materials considered to be potential threats. For example, the sensors 104 may be embodied as gamma ray sensors, and they may be disposed on or adjacent to vehicle doors for optimal entry and exit detection. The sensors 104 preferably operate continuously. In block 204, when an event is triggered at one or more of the sensors 104, the event is stamped with the sensor information described above, which includes at least a time, a date, a duration and a location. The event and sensor information is then logged in the on-board logic unit 106.

In block 206, it is determined whether a current location of the vehicle is within an authorized area for the detected emissions. There are a number of medical procedures and tests that use nuclear materials as a part of their testing and processing. A database of locations where these medical procedures take place is compiled and stored as part of the threat related reference information described above. Use of the threat related reference information in combination with a vehicle's current location allows the system to limit the potential for false positive notification of security and safety personnel that are monitoring the systems and activities. When the current location of the vehicle is in an authorized area for the detected emissions, the emissions are not reported to authorities, but the event data is maintained in the event data logging unit 112 for future use in block 208.

The probability of a person entering a vehicle having nuclear material is very low; therefore detections outside previously identified and geofenced areas should create an immediate high priority notification event. When the current location is not an authorized area for the detected emissions, the event data is transmitted from the vehicle to the third party subsystems 108 on-board the vehicle, in block 210. These third party subsystems 108 may include one or more of a Closed-Circuit Television (CCTV), an emergency alarm, voice announcements, or other vehicle monitoring systems.

In block 212, it is determined whether the sensors 104 continue to detect the emissions. When the sensors 104 do not continue to detect the emissions, the event and corresponding time, date and location tags are collected and reported to proper authorities in block 214. In an embodiment of the present invention, when sensors lose their detection capabilities prior to intervention or instruction from vehicle system management or law enforcement, a silent alarm is provided to the operator of the vehicle. This alarm may trigger procedures developed for emergency management and safe movement and evacuation of customers and agency employees.

Information is collected relating to when and where emissions of a material are first detected, and when and where emissions of a material cease. Patterns or other activities associated with the detection and loss of detection at the same and/or similar locations may then be determined, which allow law enforcement to determine locations where the materials are being collected and accumulated. More specifically, it may be determined whether the material is sensed on the transportation vehicle a predetermined number of times over a predetermined period of time.

Individuals attempting to accumulate quantities of nuclear material may also be tracked. Specifically, individuals may be tracked by integrating the location and tracking capability of the detection and reporting system with other vehicle systems having surveillance capability. Individuals may be identified through on-board surveillance systems or covert voice recordings. Location and time/date identification allow other systems in fixed locations near the on and off detection points to further track and record individuals and activities associated with the nuclear materials. This data is collected, broadcasted and distributed as required to law enforcement and other required departments and agencies.

Referring again to FIG. 2, when it is determined that the sensors 104 continue to detect the emissions, one or more of law enforcement and emergency services are automatically and immediately contacted in block 216. Specifically, if the sensors continue to detect emissions on the same vehicle in a location that is not identified as one of the predefined locations where detection would have a high probability of acceptable uses, the system activates an immediate alarm to the control system or law enforcement, as directed.

Vehicle location systems have databases that identify the type of work and the location of the vehicle, including those locations where no customers are on board and only agency personnel would have access to the vehicle. The vehicle location system would also be able to identify a storage facility for that vehicle when the vehicle is not in service, in addition to transfer and nonrevenue locations. Continuous detection of nuclear emissivity on the vehicle when it is no longer in service, or at its home location, would indicate that the nuclear material has been left on board the vehicle and has been hidden or is difficult to locate.

While the invention has been described with reference to several embodiments, it will be understood by those skilled in the art that the invention is not limited to the specific forms shown and described. Thus, various changes in form and detail may be made therein without departing from the spirit and scope of the invention as defined by the appended claims.

What is claimed is:

1. A threat detection and reporting system on-board a transportation vehicle, comprising:

a plurality of sensors for sensing a potential threat, wherein the plurality of sensors are positioned on the transportation vehicle;

a database for storing threat related reference information comprising at least geographic areas, through which the transportation vehicle may travel, that are known to contain materials known as potential threats or that are known to cause false-positives in identifying potential threats;

a memory unit for storing sensor information corresponding to the potential threat sensed by one or more of the plurality of sensors; and a processor for analyzing the sensor information, corresponding threat related reference information, and a current location of the transportation vehicle to determine whether to generate a notification.

2. The system of claim 1, wherein the sensor information comprises one or more of a time and date when sensing of a potential threat begins, a time and date when sensing of the potential threat ends, identifiers of the one or more sensors sensing the potential threat, positions of the one or more sensors within the transportation vehicle, a material identified as the potential threat, a material emission level, a location of the material within the transportation vehicle, and a location of the transportation vehicle.

3. The system of claim 1, wherein the threat related reference information comprises one or more of materials that are known as potential threats, material emission levels known to be harmful, geographic areas where the transportation vehicle is known not to be in service, and material emission levels appropriate for each geographic area.

4. The system of claim 1, wherein the processor generates the notification based on the analyzed sensor information, corresponding threat related reference information, and the current location of the transportation vehicle, and provides notification information to at least one of a transportation vehicle operator and outside systems.

5. The system of claim 1, further comprising a locating unit for determining the location of the transportation vehicle utilizing an odometer and a Global Positioning System of the transportation vehicle.

6. The system of claim 1, wherein at least a subset of the plurality of sensors are positioned near entrance and exit areas of the transportation vehicle.

7. The system of claim 1, wherein the processor analyzes the sensor information by determining whether a material identified as the potential threat has been left in the transportation vehicle.

8. The system of claim 1, wherein the processor analyzes the sensor information by determining whether a material identified as the potential threat has been brought onto or taken off the transportation vehicle.

9. The system of claim 1, wherein the processor analyzes the sensor information by determining whether a material identified as the potential threat is being accumulated by sensing the material on the transportation vehicle a predetermined number of times over a predetermined period of time.

10. The system of claim 9, wherein the processor analyzes the sensor information by further determining whether the accumulated material identified as the potential threat is being transported to a common location.

11. An on-board threat detection and reporting method in a transportation vehicle comprising the steps of:

monitoring for a potential threat at a plurality of sensors positioned on the transportation vehicle;

storing threat related reference information in a database of the transportation vehicle, wherein the threat related reference information comprises at least geographic areas, through which the transportation vehicle may travel, that are known to contain materials known as potential threats or that are known to cause false-positives in identifying potential threats;

storing sensor information corresponding to the potential threat, when the potential threat is sensed by one or more of the plurality of sensors; and analyzing the sensor information, and corresponding threat related reference information, and a current location of the transportation vehicle to determine whether to generate a notification at a processor in the transportation vehicle.

12. The method of claim 11, wherein the sensor information comprises one or more of a time and date when sensing of the potential threat begins, a time and date when sensing of the potential threat ends, identifiers of the one or more sensors sensing the potential threat, a position of the one or more sensors within the transportation vehicle, a material identified as the potential threat, a material emission level, a location of the material within the transportation vehicle, and a location of the transportation vehicle.

13. The method of claim 11, wherein the threat related reference information comprises one or more materials that are known as potential threats, material emission levels known to be harmful, geographic areas where the transportation vehicle is known not to be in service, and material emission levels appropriate for each geographic area.

14. The method of claim 11, further comprising:

generating the notification at the processor based on the analyzed sensor information, corresponding threat related reference information, and the current location of the transportation vehicle; and providing notification information to at least one of a transportation vehicle operator and outside systems.

15. The method of claim 11, further comprising determining the location of the transportation vehicle at a locating unit utilizing an odometer and a Global Positioning System of the transportation vehicle.

16. The method of claim 11, wherein at least a subset of the plurality of sensors are positioned near entrance and exit areas of the transportation vehicle.

17. The method of claim 11, wherein analyzing sensor information comprises determining whether a material identified as the potential threat has been left in the transportation vehicle.

18. The method of claim 11, wherein analyzing sensor information comprises determining whether a material identified as the potential threat has been brought on or taken off the transportation vehicle.

19. The method of claim 11, wherein analyzing the sensor information comprises determining whether a material identified as the potential threat is being accumulated by sensing the material a predetermined number of times over a predetermined period of time.

20. The method of claim 19, wherein analyzing the sensor information further comprises determining whether the accumulated material identified as the potential threat is being transported to a common location.

* * * * *